United States Patent [19]
Ordorica

[11] 3,856,329
[45] Dec. 24, 1974

[54] SENSING ARM FOR CONTROL UNIT BETWEEN ARTICULATED VEHICLES

[75] Inventor: Miguel A. Ordorica, Temperance, Mich.

[73] Assignee: The Mather Company, Toledo, Ohio

[22] Filed: Oct. 24, 1973

[21] Appl. No.: 409,058

[52] U.S. Cl. ............................................. 280/432
[51] Int. Cl. ............................................ B62d 53/08
[58] Field of Search ............................ 280/432, 433

[56] References Cited
UNITED STATES PATENTS

| | | | |
|---|---|---|---|
| 2,962,301 | 11/1960 | Leinbach | 280/432 |
| 3,512,803 | 5/1970 | Hines et al. | 280/432 |
| 3,517,946 | 6/1970 | Rumsey et al. | 280/432 |
| 3,722,918 | 3/1973 | Conner | 280/432 |

*Primary Examiner*—Leo Friaglia
*Assistant Examiner*—Randall A. Schrecengost

[57] ABSTRACT

A radially extending arm rigidly attached to the king pin which fits into the "V" slot of a fifth wheel in a connection between two articulated vehicles, which arm contains a slidable cross member, the ends of which contact the edges of the "V" notch in said fifth wheel, and which cross member is urged toward said king pin by a spring connected between it and said arm. The king pin is integrally connected to an hydraulic rotary type of control unit for damping the relative angular movements between two articulated vehicles to aid in preventing jack-knifing of the vehicles.

11 Claims, 5 Drawing Figures

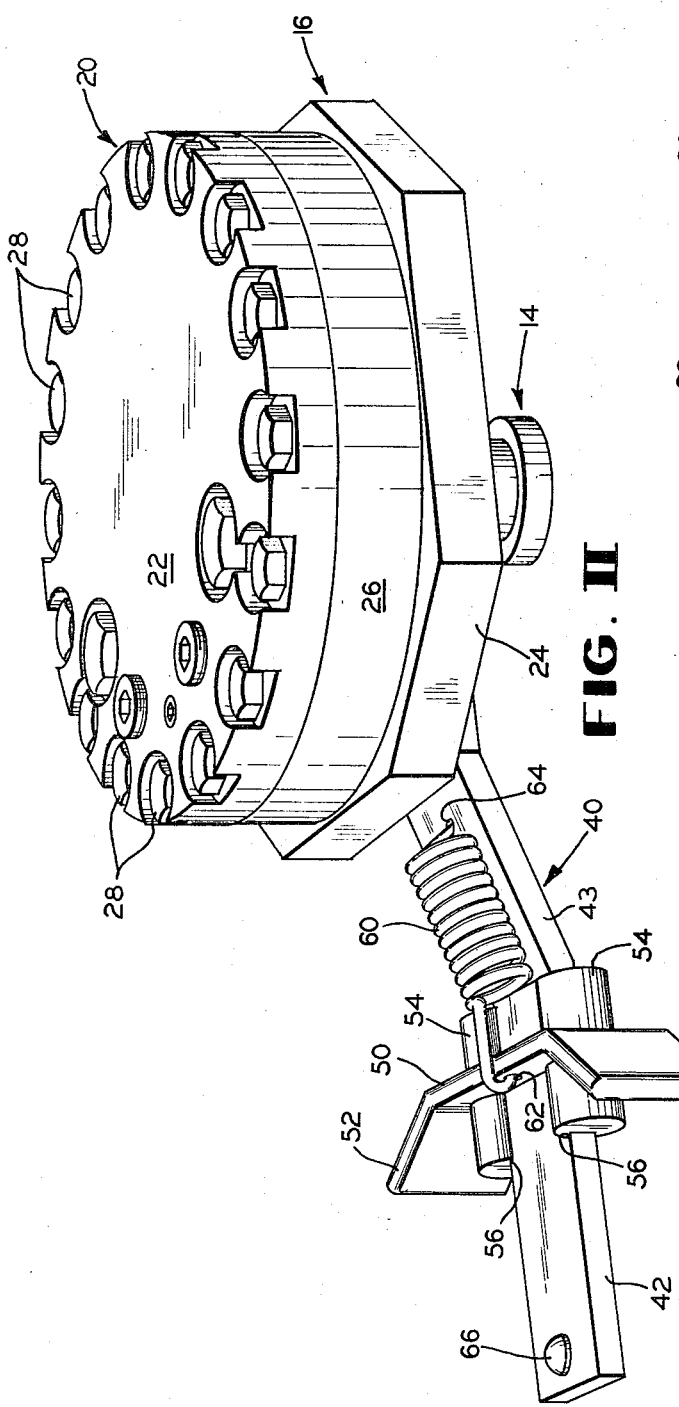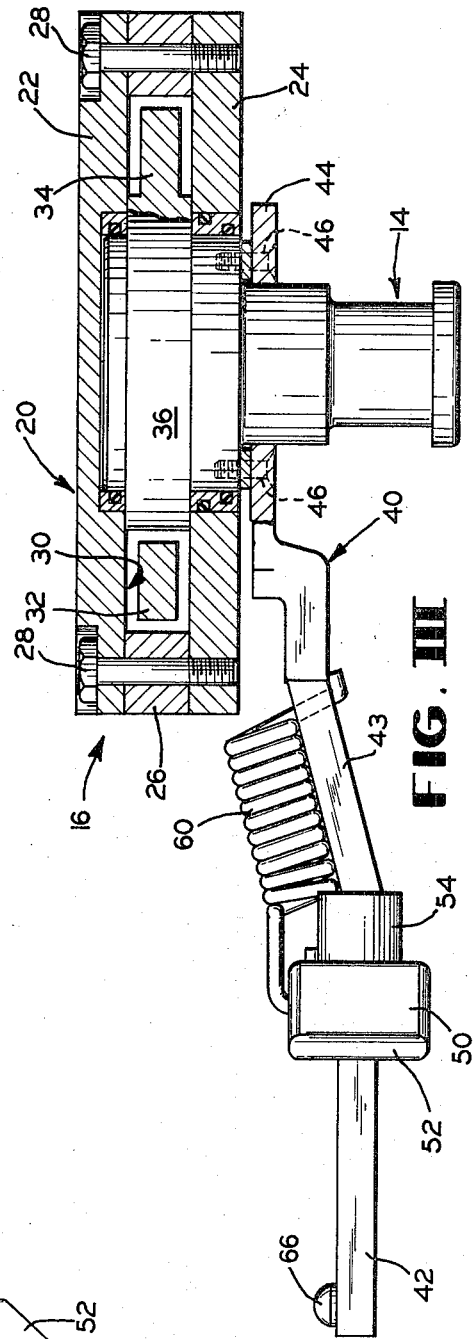

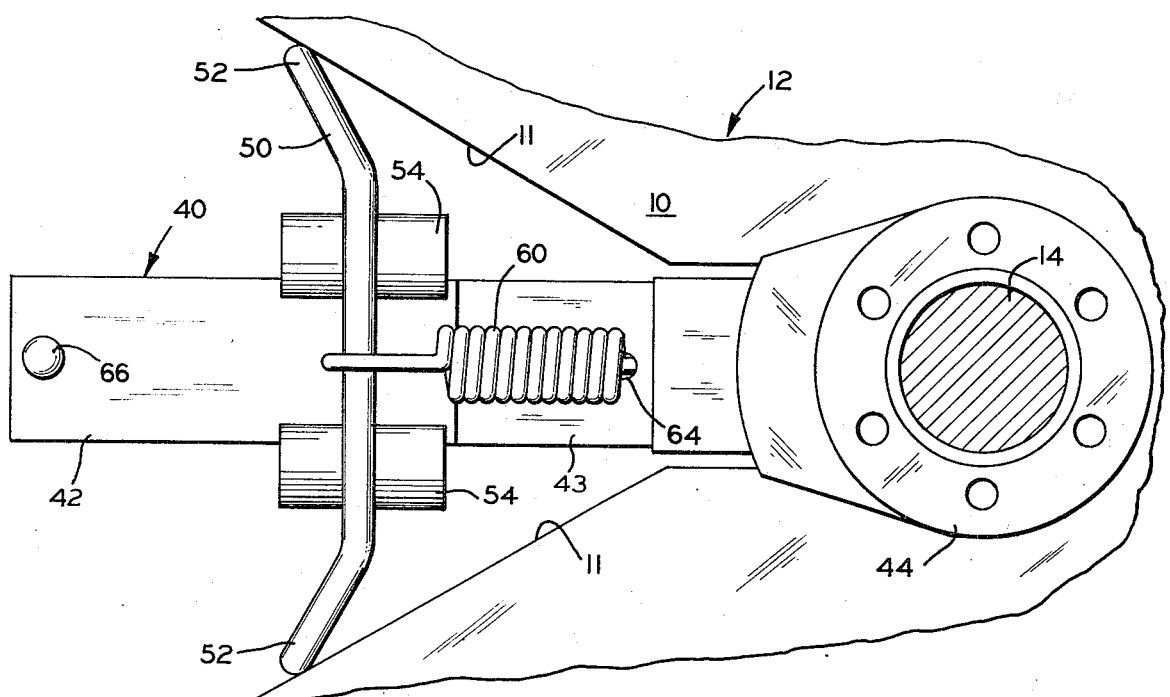
FIG. IV
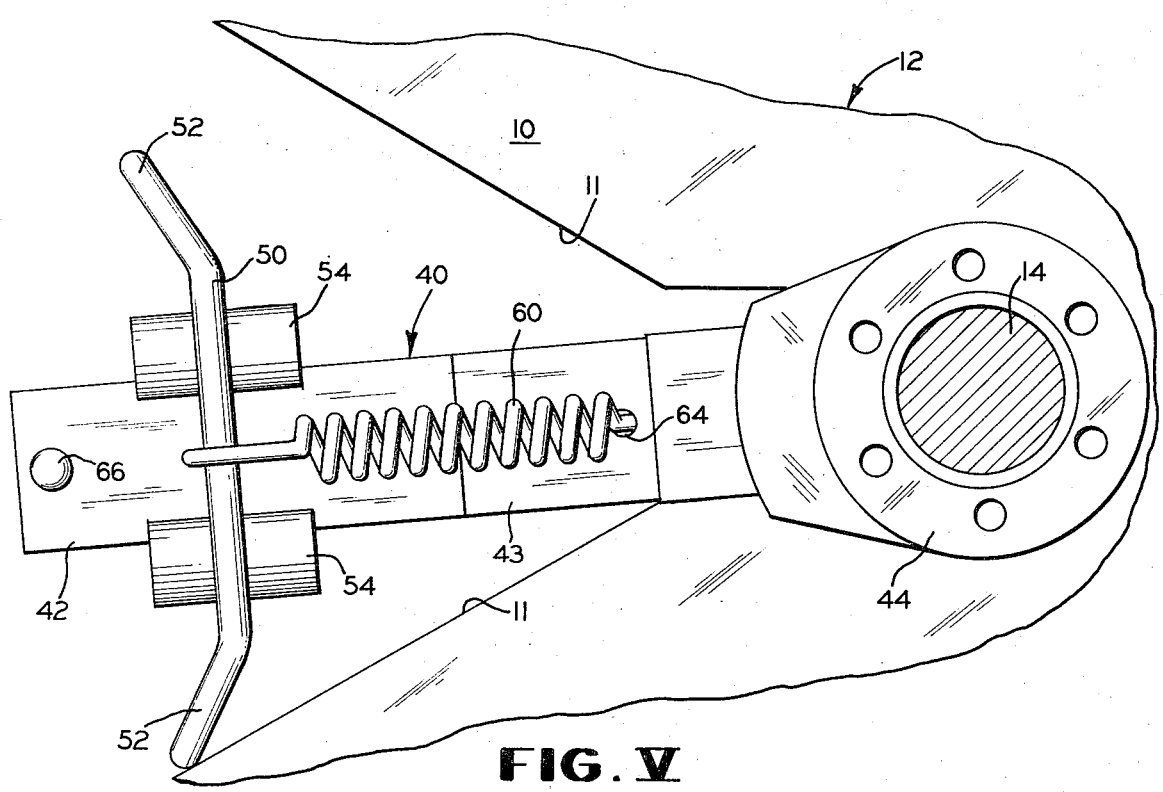
FIG. V

SENSING ARM FOR CONTROL UNIT BETWEEN ARTICULATED VEHICLES

BACKGROUND OF THE INVENTION

This invention is an improvement in the sensing arm shown in FIGS. 7 and 8 of Hines et al. U.S. Pat. No. 3,512,803 issued May 19, 1970. Although the sensing arm connected to the control unit as disclosed in this Hines et al. patent has resilient sides to fit different width slots at the apex of the "V" notch in the fifth wheel, the width of these slots varies between about 2 1/2 inches and 3 inches on different vehicles so that the resilient sides of this relatively short arm often sloppily fit into said slots, permitting wobble, yaw, and small relative angular movements between the two vehicles that are not always transmitted to and sensed by the control unit. Thus the control unit comprising a hydraulic damping vane connected to the king pin and extending radially integrally therefrom as said sensing arm, can not continuously and immediately respond to all relatively slight angular movements between the vehicles.

SUMMARY OF THE INVENTION

Generally speaking, the control unit having the sensing arm of this invention is used to reduce jack-knifing between articulated vehicles, particularly between a tractor and trailer combination, which control unit comprises a circular hydraulic damper having a radial vane therein fixedly attached to the king pin, which king pin has another radial vane or arm that fits into the "V" shaped slot of the fifth wheel of the other vehicle, so as to transmit relative angular movement between the two vehicles to the vane in the damping unit. In order that the sensing arm responds immediately to this relative movement it is important that the second radial vane accurately, snugly and continuously engages at least one if not both of the sides of the "V" shaped notch of the fifth wheel into which it fits.

Thus, the improvement of this invention comprises a relatively long sensing arm which extends beyond the relative parallel sides of the apex of such "V" shaped notches into which the king pin normally is latched when the vehicles are connected together, and which extends radially outwardly bisecting the angle of the "V" by a relatively long sensing arm, which sensing arm has a slidable cross bar or member, the ends of which engage opposite sides of the angular "V" portion of notch. This cross member may have a slight dihedral angle, bent away from the apex of the "V" notch and includes means for sliding along said sensing arm so that when only one end of the cross member contacts one side of the "V" notch, the slide is so constructed that the cross member will cant and wedge on the arm and not slide outwardly therefrom. Thus the arm immediately transmits any relative angular movement between the two articulated vehicles to the radial vane in the control unit.

In order to insure no such outwardly sliding of the cross member, there may be provided a helical tension spring connnected between the cross member, preferably between the sliding means and the arm itself between the cross member and the king pin, which spring normally urges the cross member to wedge as much as possible toward the apex of the "V" slot. When the two vehicles are in alignment with the sensing arm, the spring easily slides the cross member along the sensing arm so that both ends of the cross member contact the edges of the "V", regardless of the angularity of the sides of the "V" notch. The end of the sensing arm may be provided with a stop to limit the outward movement of the sliding cross arm, and the vertical width of at least the ends of the cross member is sufficient so that they will always engage the edges of the "V" notch, regardless of the angle of the fifth wheel with respect to that of the sensing arm.

Accordingly, it is an object and purpose of this invention to overcome this difficulty and produce a sensing arm for such control units which is simple, effective, economic, efficient, light weight, and accurately and immediately transmits all angular movements of the fifth wheel relative to the king pin and the control unit.

Another object is to eliminate slack between the parts, prevent yaw between the articulated vehicles, and to aid the two articulated vehicles to get back into alignment almost immediately after any small relative angular movement occurs between them.

BRIEF DESCRIPTION OF THE DRAWINGS

The above mentioned and other features, objects and advantages, and the manner of attaining them are described more specifically below by reference to an embodiment of this invention shown in the accompanying drawings, wherein.

Figure 1:
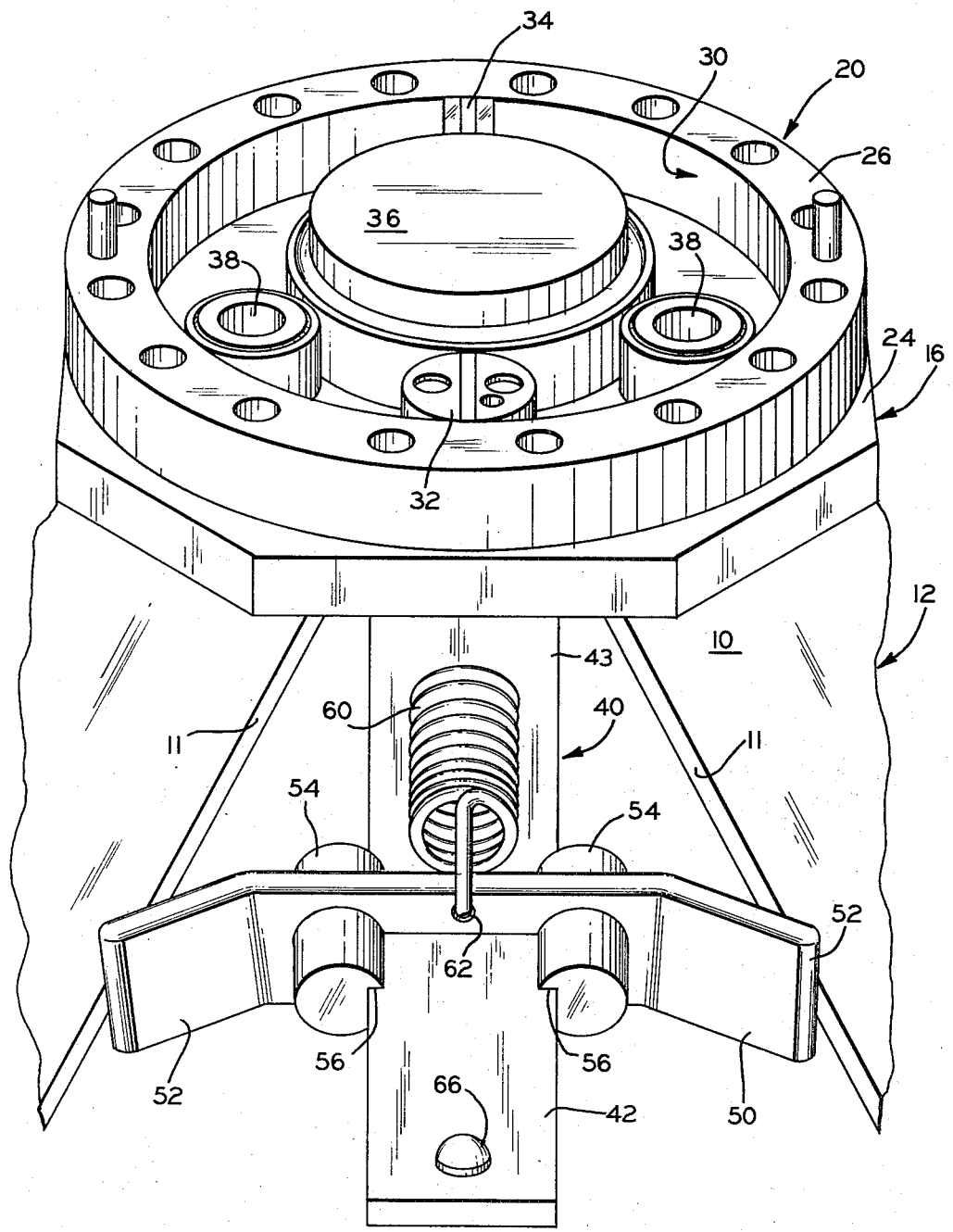
FIG. 1 is a perspective view looking inwardly toward the apex of the "V" shaped slot of a fifth wheel of a vehicle, most of which fifth wheel is broken away, and showing the end of a preferred embodiment of the sensing arm of this invention connected to a control unit, the top plate of which unit has been removed to show the damping vane and stops therein.

FIG. II is a perspective side view of the control unit and the sensing arm of the invention shown in FIG. I, with the top plate of the unit in place thereon;

FIG. III is a longitudinal sectional view of the control unit shown in FIGS. I and II with the sensing arm attached to the king pin thereof, showing the damping vane fixedly attached to the king pin portion in the control unit;

FIG. IV is a plan view of the sensing arm of FIG. 1 with the control unit removed, showing its cross member in its preferred seated position in the "V" notch of a fifth wheel; and FIG. V is a plan view similar to FIG. IV showing how one end of the cross member of the sensing arm of this invention can engage one side of the "V" shaped notch of a fifth wheel.

DETAILED DESCRIPTION OF PREFERRED EMBODIMENT

In FIGS. I, IV and V there are shown portions of a fifth wheel 10 on one or two articulated vehicles 12, into the "V" notch 11 of which extends a king pin 14 (see FIGS. II and III) attached to the other of two articulated vehicles 16 shown in FIGS. I and II, and to which king pin 14 is attached an angular hydraulic damping control unit 20 shown in FIGS. I, II and III.

This control unit 20 comprises top and bottom plates 22 and 24, respectively, bolted together by means of a spacer ring 26 and bolts 28 to form an annular hydraulic fluid containing chamber 30 (see FIGS. I and III) divided into two parts by a fixed radial vane 32 and a movable radial vane 34 rigidly or integrally connected to the hub extension 36 of the king pin 14. This vane 34 oscillates in the chamber 30 in accordance with relative angular movements between the vehicles 12 and 16. There is also shown inside the annular chamber 30 in FIG. I, a pair of stops 38 for limiting the relative angular movement of the vane 34, as well as to protect the fixed vane 32 which is integrally anchored to at least one if not both of the plates 22 and/or 24. A bleeder duct (not shown herein) is provided between the two halves of the annular chamber 30 divided by the vanes 32 and 34, as described and shown in the above mentioned Hines et al. U.S. Pat. No. 3,512,803.

The sensing vane 40 according to this invention comprises an integral offset radial arm portion 42, an offsetting portion 43 and having an annular ring 44 at one end thereof, which ring is shown in FIGS. III, IV, and V and fits around the king pin 14 and is bolted by a plurality of bolts 46 into the hub extension 36 thereof so as to be fixedly attached with the pin 14 and the movable vane 34. Thus any angular movement of the arm 40 will be immediately and instantaneously transmitted to the vane 34 in the chamber 30 of the control unit 20. The outer portion 42 of arm 40 as shown in FIGS. I, IV and V extends radially outwardly beyond the periphery of the control unit 20 and into the "V" shaped notch 11 of the fifth wheel 10. Longitudinally slidable along this offset outer portion 42 of the arm 40 is provided a cross member, bar or cross head 50 which may have dihedral angled ends 52 approaching the angle of the notch 11. This cross member 50 is provided with integral slide members 54 which have grooves 56 as shown in FIGS. I and II for guiding the sliding cross member 50 along the opposite edges of the portion 42 of the arm 40. These guiding and sliding means 54 and grooves 56 have sufficient length of contact along the edges of this arm portion 42 to frictionally grab the arm and prevent sliding motion when only one end 52 of the cross member 50 is connected by one edge of the "V" notch 11 as shown in FIG. V.

Outward sliding and loosening of the engagement between the ends 52 of the cross member 50 and the edges of the "V" notch 11 is prevented by the continuous pull of helical spring 60, herein shown to be connected between a central aperture 62 in the cross member 50 and a corresponding aperture 64 in the offsetting bended portion 43 of the bar 42 between the cross member 50 and the king pin 14. The stretching, urging, and canting of the cross member 50 by the spring 60 is shown more clearly in FIG. V. A pin or bolt stop 66 at the outer end of the portion 42 of the arm 40 prevents the cross member 50 from being pulled off the arm 40 during the attachment of the articulated vehicles 12 and 16, or its dropping off if the spring 60 breaks. This stop also permits easy assembly and removal of the cross member 50 onto the arm 40.

FIGS. IV and V show that the sensing arm 40 of this invention rigidly connected to the king pin 14 will always fit snuggly into and against at least one side of all different angled "V" notches II of a fifth wheel 10, and will continuously sense all relative angular movements between the king pin 14 connected to the vehicle 16 and the fifth wheel 10 mounted on the other vehicle 12. Also no outwardly sliding of the cross member 50 is permitted due to the canting action of the slides 54 in their grooves 56 along the edges of the portion 42 of the arm 40 together with the action of the spring 60.

However, when the two vehicles are properly aligned the sliding action of the cross member 50 along the arm portion 42 is relatively easy, being resisted in its outward movement only by the action of the spring 60.

If desired, the spring 60 may be mounted on the other side of the arm 40 from that shown in drawing without departing from the scope of this invention.

While there is described above the principles of this invention in connection with specific apparatus, it is to be clearly understood that this description is made only by way of example and not as a limitation to the scope of this invention.

I claim:

1. In an articulated connection between two vehicles having a king pin mounted on one vehicle that fits into a "V" shaped notch in the fifth wheel mounted on the other vehicle, and having a control unit attached to said king pin for damping relative angular movement between two said vehicles, the improvement in a sensing means attached to said king pin and fitting in said notch said sensing means comprising:
   A. a radially extending arm fixedly attached to said king pin,
   B. a cross member slidable along said arm, the ends of which cross member are engageable with the edges of said "V" shaped notch, and
   C. spring means acting on said cross member for urging said cross member towards said king pin.

2. A connection according to claim 1 wherein said control unit comprises a rotary hydraulic damping unit having radial vane therein fixedly attached to said king pin.

3. A connection according to claim 1 wherein said cross member includes means slidably engaging along opposite sides of said arm.

4. A connection according to claim 1 wherein said ends of said cross member are bent in a dihedral angle approaching that of said "V" shaped notch.

5. A connection according to claim 1 wherein said spring means comprises a tension spring located on the upper side of said arm adjacent said control unit.

6. A connection according to claim 1 wherein said spring means is attached between said arm and said cross member.

7. A sensing means for relative oscillatory movement between two articulated vehicles having a "V" shaped notch for a fifth wheel on one vehicle for seating a king pin on the other vehicle, comprising:
   A. a lever anchored for oscillatory movement with said king pin fitting into the "V" shaped notch of said fifth wheel,
   B. a rigid cross bar on said lever for engagement with the opposite sides of said "V" shaped notch,
   C. means for urging said cross bar toward said king pin to maintain continuous contact with said notch, and
   D. sliding means on said cross bar for gripping said lever when unequal forces are applied to the ends of said cross bar by contact with said notch.

8. A sensing means according to claim 7 wherein said urging means comprises a spring connected between said cross bar and said lever.

9. A sensing means according to claim 7 wherein said spring is a tension spring and said connection to said lever is between said cross bar and said king pin.

10. A sensing means according to claim 7 including a control unit integrally connected to said king pin for damping relative oscillatory movements between said articulated vehicles.

11. A sensing means according to claim 10 wherein said damping means comprises a rotary hydraulic damping means having a vane therein fixedly attached to said king pin.

* * * * *